United States Patent
Damnjanovic et al.

(10) Patent No.: US 8,169,953 B2
(45) Date of Patent: May 1, 2012

(54) METHOD AND APPARATUS FOR WIRELESS MULTI-CARRIER COMMUNICATIONS

(75) Inventors: Aleksandar Damnjanovic, Del Mar, CA (US); Lorenzo Casaccia, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 760 days.

(21) Appl. No.: 11/435,573

(22) Filed: May 16, 2006

(65) Prior Publication Data

US 2006/0280142 A1 Dec. 14, 2006

Related U.S. Application Data

(60) Provisional application No. 60/682,181, filed on May 17, 2005.

(51) Int. Cl.
  H04W 4/00 (2009.01)
  H04W 72/00 (2009.01)
  H04J 3/00 (2006.01)
  H04B 7/212 (2006.01)

(52) U.S. Cl. ........ 370/329; 370/337; 370/344; 370/347; 455/422.1; 455/434; 455/450

(58) Field of Classification Search ........................ None
  See application file for complete search history.

(56) References Cited

U.S. PATENT DOCUMENTS

| | | | |
|---|---|---|---|
| 5,663,958 A | 9/1997 | Ward | |
| 5,680,142 A | 10/1997 | Smith et al. | |
| 5,946,634 A | 8/1999 | Korpela | |
| 6,081,697 A * | 6/2000 | Haartsen | 455/109 |
| 6,430,395 B2 | 8/2002 | Arazi et al. | |
| 6,510,174 B1 | 1/2003 | Sexton et al. | |
| 6,564,061 B1 | 5/2003 | Guo et al. | |
| 6,597,923 B1 | 7/2003 | Vanghi et al. | |
| 6,601,207 B1 | 7/2003 | Vanttinen | |
| 6,654,374 B1 | 11/2003 | Fawaz et al. | |

(Continued)

FOREIGN PATENT DOCUMENTS

CN  1321007 A  11/2001

(Continued)

OTHER PUBLICATIONS

3GPP TS 05.01: "Technical Specification Group GERAN; Digital Cellular Telecommunications System (Phase 2+); Physical Layer on the Radio Path; General Description", Release 1999, Nov. 2001.

(Continued)

*Primary Examiner* — Hassan Phillips
*Assistant Examiner* — Hicham Foud
(74) *Attorney, Agent, or Firm* — Rupit M. Patel

(57) ABSTRACT

A Global System for Mobile Communications (GSM) network supports multi-carrier operation on the downlink and/or uplink for a mobile station. The mobile station receives an assignment of multiple carriers for a first link in the GSM network, receives an assignment of at least one carrier for a second link in the GSM network, and exchanges data with the GSM network via the multiple carriers for the first link and the at least one carrier for the second link. The first link may be the downlink and the second link may be the uplink, or vice versa. The mobile station may receive data on multiple carriers at the same time for multi-carrier operation on the downlink. The mobile station may transmit data on multiple carriers at the same time for multi-carrier operation on the uplink.

40 Claims, 8 Drawing Sheets

U.S. PATENT DOCUMENTS

| | | |
|---|---|---|
| 6,963,544 B1 | 11/2005 | Balachandran et al. |
| 7,035,644 B1 | 4/2006 | Maruyama |
| 7,200,124 B2 | 4/2007 | Kim et al. |
| 2001/0055297 A1 | 12/2001 | Benveniste |
| 2002/0049051 A1 | 4/2002 | Parisel et al. |
| 2003/0117980 A1* | 6/2003 | Kim et al. ............... 370/332 |
| 2003/0169723 A1 | 9/2003 | Diachina et al. |
| 2003/0235167 A1* | 12/2003 | Kuffner ..................... 370/335 |
| 2004/0153551 A1 | 8/2004 | Haumont et al. |
| 2005/0249266 A1* | 11/2005 | Brown et al. .............. 375/133 |
| 2005/0281222 A1* | 12/2005 | Ranta-Aho et al. ........ 370/328 |
| 2006/0092877 A1* | 5/2006 | Niemela ..................... 370/330 |
| 2006/0146695 A1* | 7/2006 | Maheshwari et al. ....... 370/216 |
| 2006/0221894 A1* | 10/2006 | Casaccia et al. ............ 370/328 |
| 2007/0014265 A1* | 1/2007 | Casaccia ..................... 370/337 |

FOREIGN PATENT DOCUMENTS

| | | |
|---|---|---|
| EP | 0488976 | 6/1992 |
| EP | 1107637 A1 | 6/2001 |
| JP | 2001231073 A | 8/2001 |
| JP | 2001517049 | 10/2001 |
| JP | 2002542707 T | 12/2002 |
| KR | 20010062213 | 7/2001 |
| WO | WO9212603 | 7/1992 |
| WO | WO9529547 | 11/1995 |
| WO | WO9931823 A1 | 6/1999 |
| WO | WO0064059 | 10/2000 |

OTHER PUBLICATIONS

3GPP TS 45.008: "Digital Cellular Telecommunications System (Phase 2+); Radio Subsystem Link Control", Release 6, Jun. 2005.
International Search Report, PCT/US06/019433—International Search Authority—United States—Jul. 7, 2008.
Writen Opinion—PCT/US06/019433—International Search Authority—ISA/US—Jul. 7, 2008.
Taiwanese Search report—095117471—TIPO—Mar. 3, 2010.
Translation of Office Action in Japan application 2008-512540 corresponding to U.S. Appl. No. 11/435,573, citing JP2002542707, WO9931823, JP2001231073 and JP2001517049 dated Jan. 4, 2011.

* cited by examiner

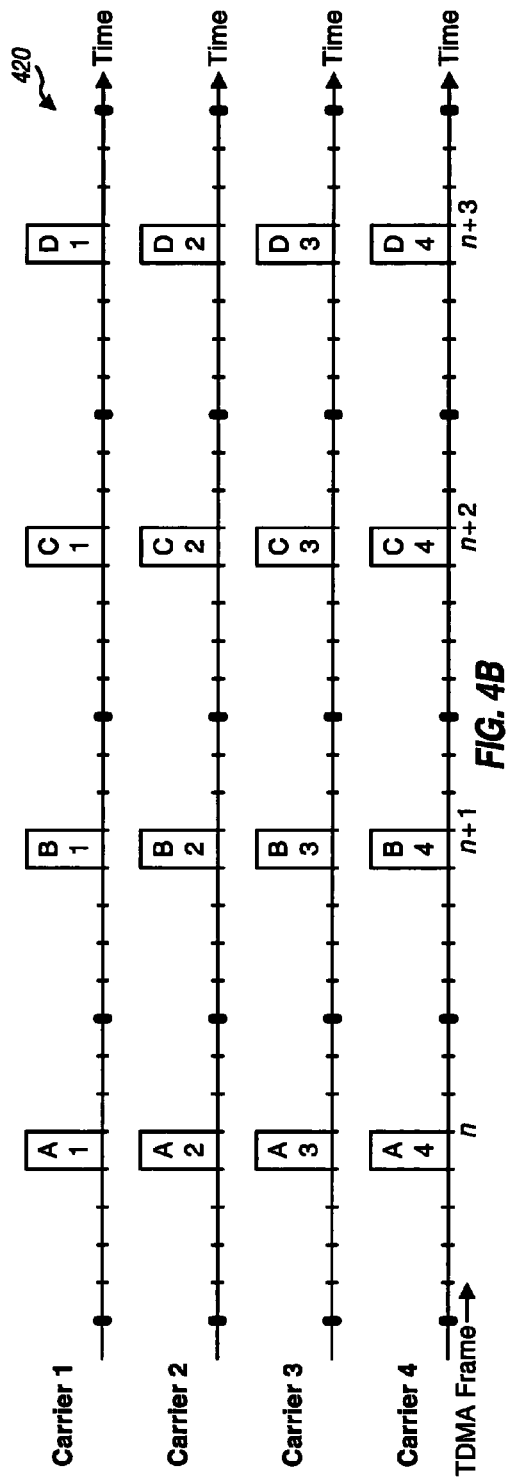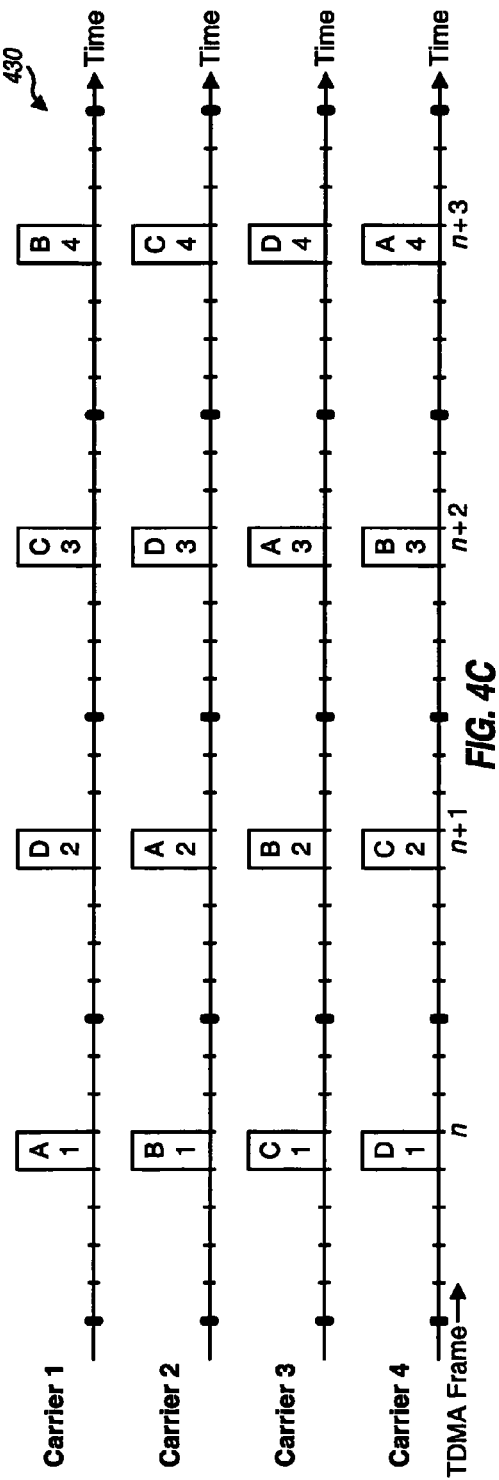

METHOD AND APPARATUS FOR WIRELESS MULTI-CARRIER COMMUNICATIONS

CLAIM OF PRIORITY UNDER 35 U.S.C. §119

The present Application for Patent claims priority to Provisional Application Ser. No. 60/682,181, entitled "METHOD AND APPARATUS FOR MULTI-CHANNEL WIRELESS COMMUNICATIONS," filed May 17, 2005, assigned to the assignee hereof, and expressly incorporated herein by reference.

BACKGROUND

I. Field

The present disclosure relates generally to communication, and more specifically to techniques for transmitting data in a wireless communication network.

II. Background

Wireless communication networks are widely deployed to provide various communication services such as voice, packet data, broadcast, messaging, and so on. These networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks.

Data usage for wireless communication networks continually grows due to increasing number of users as well as emergence of new applications with higher data requirements. However, a given network typically has a specific maximum supported data rate for each user, which is determined by the design of the network. A substantial increase in the maximum supported data rate is often realized by deploying a new generation or a new design of a network. For example, the transition from second generation (2G) to third generation (3G) in cellular networks provides substantial improvements in data rate and features. However, new network deployment is capital intensive and often complicated.

There is therefore a need in the art for techniques to improve throughput for users in a wireless communication network in an efficient and cost effective manner.

SUMMARY

Techniques for utilizing multiple carriers on the downlink and/or uplink to significantly improve throughput for a mobile station in a wireless communication network, e.g., a Global System for Mobile Communications (GSM) network, are described herein. A carrier may correspond to a radio frequency (RF) channel in GSM. The GSM network may support multi-carrier operation on the downlink and/or uplink. The mobile station may receive data on multiple carriers at the same time for multi-carrier operation on the downlink. The mobile station may transmit data on multiple carriers at the same time for multi-carrier operation on the uplink. The mobile station may be assigned one or more carriers for the downlink and one or more carriers for the uplink depending on various factors.

According to an exemplary embodiment of the invention, an apparatus is described which includes at least one processor and a memory. The processor(s) receive an assignment of multiple carriers for a first link in a GSM network, receive an assignment of at least one carrier for a second link in the GSM network, and exchange data with the GSM network via the multiple carriers for the first link and the at least one carrier for the second link. The first link may be the downlink and the second link may be the uplink, or vice versa.

According to another exemplary embodiment, an apparatus is described which includes at least one processor and a memory. The processor(s) assign multiple carriers for a first link to a mobile station in the GSM network, assign at least one carrier for a second link to the mobile station, and exchange data with the mobile station via the multiple carriers for the first link and the at least one carrier for the second link.

Various exemplary embodiments of the invention are described in further detail below.

BRIEF DESCRIPTION OF THE DRAWINGS

FIGS. 4A-4C show three data transmission schemes in multi-carrier operation.

FIGS. 5A and 5B show two frequency hopping schemes.

DETAILED DESCRIPTION

The word "exemplary" is used herein to mean "serving as an example, instance, or illustration." Any exemplary embodiment described herein as "exemplary" is not necessarily to be construed as preferred over other exemplary embodiments.

The transmission techniques described herein may be used for various wireless communication networks such as CDMA, TDMA, FDMA and OFDMA networks. The terms "network" and "system" are often used interchangeably. A CDMA network may implement one or more radio technologies such as cdma2000, Wideband-CDMA (W-CDMA), and so on. cdma2000 covers IS-2000, IS-856, IS-95, and other standards. A TDMA network may implement one or more radio technologies such as GSM, Enhanced Data rates for Global Evolution (EDGE), and so on. These various radio technologies and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

For clarity, the transmission techniques are specifically described below for a GSM network, and GSM terminology is used in much of the description below. A GSM network may be a GSM EDGE radio access network (GERAN) or some other GSM network.

Figure 1:
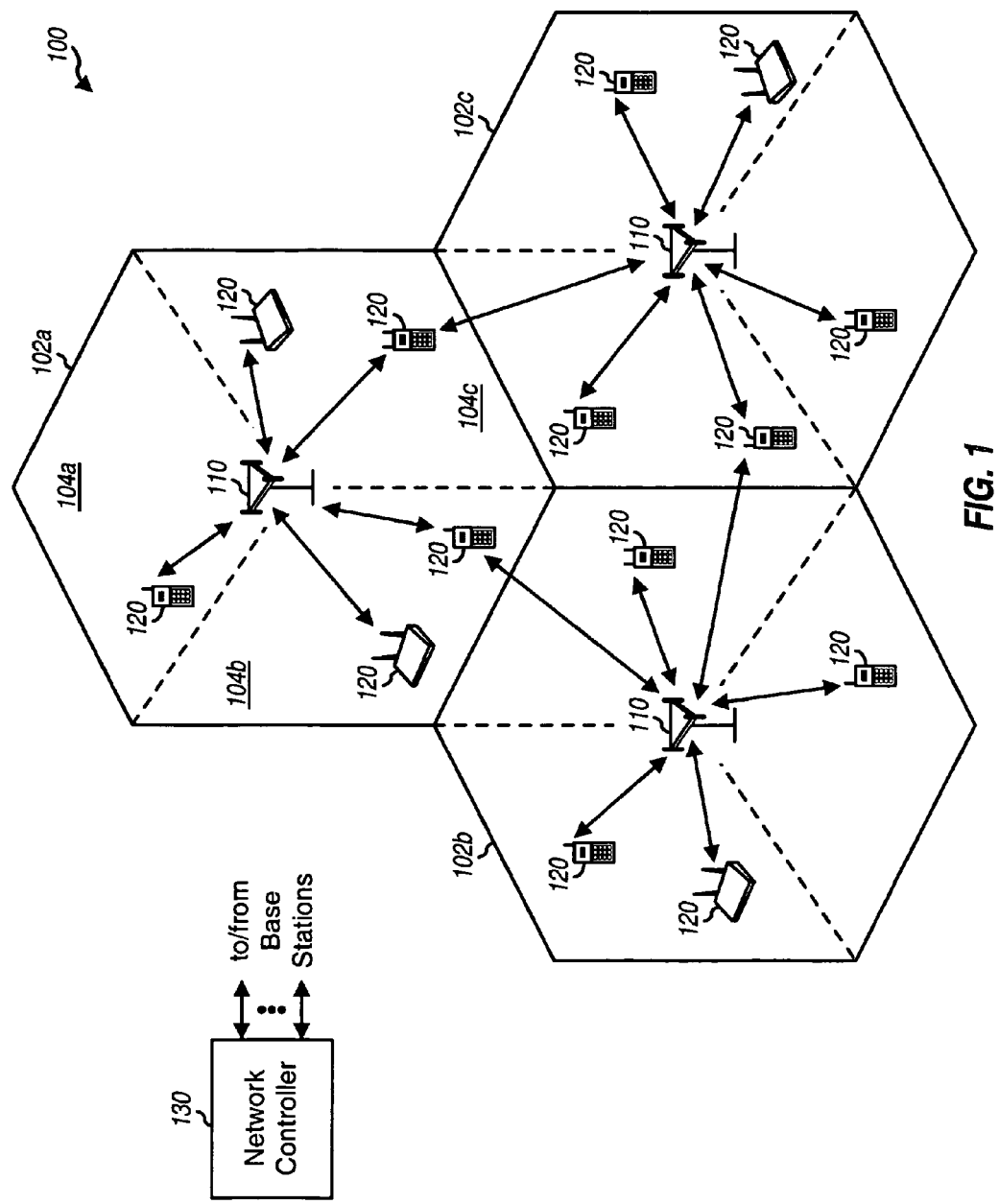
FIG. 1 shows a GSM network.

FIG. 1 shows a GSM network 100 with base stations 110 and mobile stations 120. A base station is generally a fixed station that communicates with the mobile stations and may also be referred to as a Node B, a base transceiver subsystem (BTS), an access point, and/or some other terminology. Each base station 110 provides communication coverage for a particular geographic area 102. The term "cell" can refer to a base station and/or its coverage area depending on the context in which the term is used. A network controller 130 couples to base stations 110 and provides coordination and control for these base stations. Network controller 130 may be a single network entity or a collection of network entities. For example, network controller 130 may include a base station controller (BSC), and mobile switching center (MSC), and so on.

Mobile stations 120 are typically dispersed throughout the network, and each mobile station may be stationary or mobile. A mobile station may also be referred to as a user equipment, a terminal, a subscriber station, or some other terminology. A mobile station may be a cellular phone, a personal digital assistant (PDA), a wireless communication device, a handheld device, a wireless modem, and so on. A mobile station may communicate with a base station on the downlink and/or uplink. The downlink (or forward link) refers to the communication link from the base stations to the mobile stations, and the uplink (or reverse link) refers to the communication link from the mobile stations to the base stations.

The GSM network may operate on one or more frequency bands such as GSM 900, GSM 1800, and GSM 1900 bands. Each frequency band covers a specific range of frequencies and is divided into a number of 200 kHz RF channels. Each RF channel is identified by a specific ARFCN (absolute radio frequency channel number). Table 1 lists the frequency ranges for the downlink and uplink as well as the ARFCNs for the GSM 900, GSM 1800, and GSM 1900 bands.

TABLE 1

| Frequency Band | Uplink (MHz) | Downlink (MHz) | ARFCN |
| --- | --- | --- | --- |
| GSM 900 | 890-915 | 935-960 | 1-124 |
| GSM 1800 | 1710-1785 | 1805-1880 | 512-885 |
| GSM 1900 | 1850-1910 | 1930-1990 | 512-810 |

Each base station in the GSM network transmits data and signaling on a set of RF channels assigned to that base station by a network operator. To reduce inter-cell interference, base stations located near each other are assigned different sets of RF channels such that the transmissions for these base stations do not interfere with one another.

Figure 2:
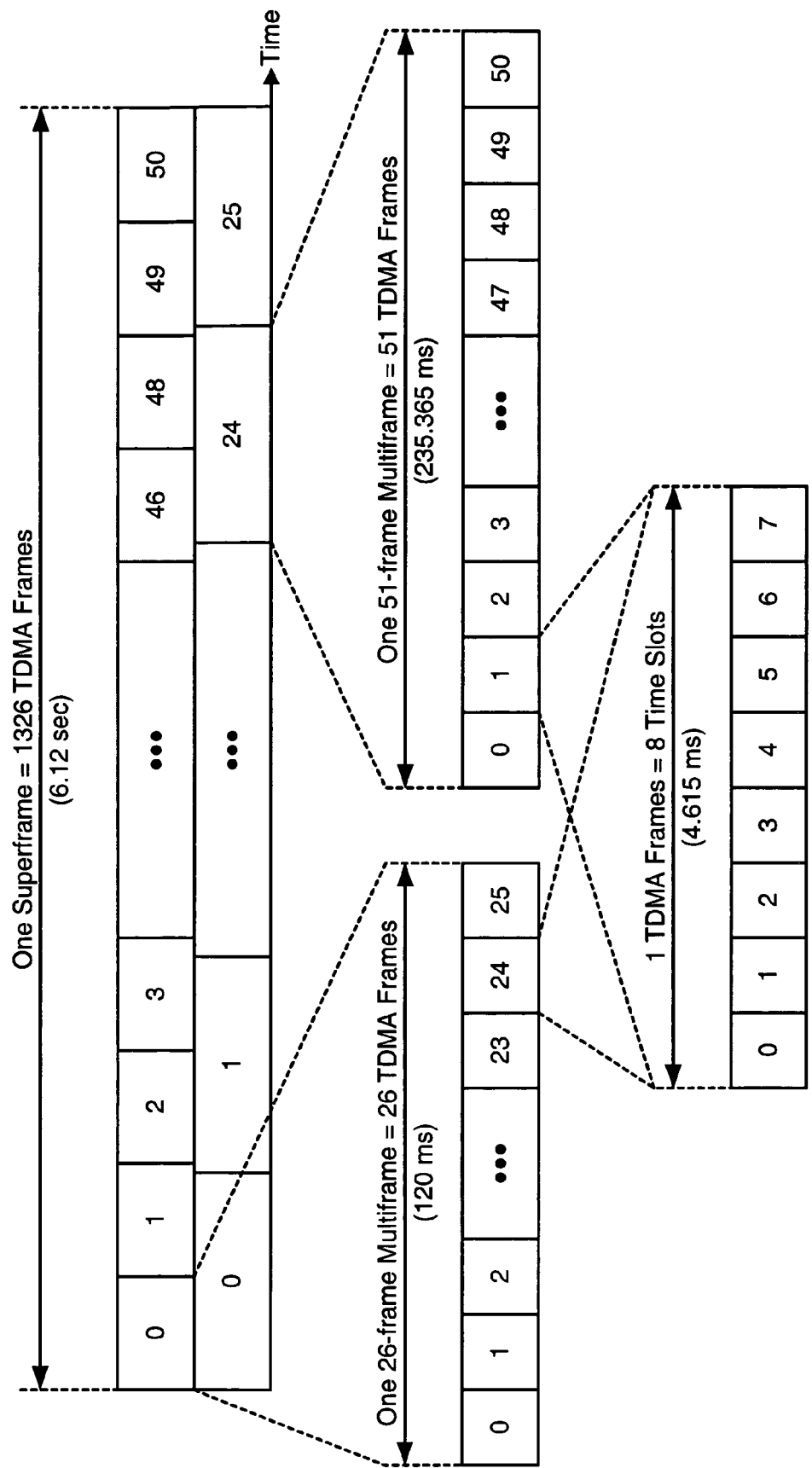
FIG. 2 shows a frame structure in GSM.

FIG. 2 shows a frame structure in GSM. The timeline for transmission is divided into superframes. Each superframe has a duration of 6.12 seconds and includes 1326 TDMA frames. A superframe may be partitioned into either 51 26-frame multiframes or 26 51-frame multiframes. The 26-frame multiframes are generally used for traffic channels, and the 51-frame multiframes are generally used for control channels. Each 26-frame multiframe spans 120 milliseconds (ms) and includes 26 TDMA frames, which are labeled as TDMA frames 0 through 25. Traffic data may be sent in TDMA frames 0 through 11 and TDMA frames 13 through 24 of each 26-frame multiframe. Each 51-frame multiframe spans 235.365 ms and includes 51 TDMA frames, which are labeled as TDMA frames 0 through 50.

Each TDMA frame spans 4.615 ms and is partitioned into 8 time slots, which are labeled as time slots 0 through 7. A transmission in each time slot is referred to as a "burst" in GSM. The frame structure for GSM is described in 3GPP TS 05.01, entitled "Technical Specification Group GERAN; Digital cellular telecommunications system (Phase 2+); Physical layer on the radio path; General description," Release 1999, November 2001, which is publicly available.

In an exemplary embodiment, the GSM network supports multi-carrier operation on the downlink (DL) and/or uplink (UL). A mobile station may receive data on multiple RF channels at the same time for multi-carrier operation on the downlink. The mobile station may transmit data on multiple RF channels at the same time for multi-carrier operation on the uplink. The mobile station may be assigned one or more RF channels for the downlink and one or more RF channels for the uplink depending on various factors such as the availability of radio resources, data requirements and capabilities of the mobile station, and so on. The terms "RF channels" and "carriers" are used interchangeably herein. For clarity, much of the following description relates to multi-carrier operation for one mobile station.

The mobile station may be assigned any number of time slots for each carrier assigned for the downlink and uplink. The same or different numbers of time slots may be assigned for different carriers. The mobile station may be assigned the same number of time slots on all DL carriers and may then have equal transmission capabilities on all DL carriers. For example, the mobile station may receive an assignment of (4+4)+2 time slots, which means four time slots for each of two DL carriers and two time slots for one UL carrier. The mobile station may also be assigned different numbers of time slots for the DL carriers. For example, the mobile station may receive an assignment of (4+2)+2 time slots, which means four time slots for one DL carrier, two time slots for another DL carrier, and two time slots for one UL carrier. The number of assigned time slots for each link may be dependent on the various factors such as those noted above for carrier assignment. Assignments of time slots and carriers are typically semi-static and controlled by the GSM network via upper-layer signaling.

On the downlink, the assigned time slots may be shared with other mobile stations. The mobile station is allocated a given assigned time slot if data is sent to the mobile station in that time slot. A multi-slot allocation is an allocation of more than one time slot in a TDMA frame to the mobile station. Allocations of time slots are typically dynamic and may be controlled on a per packet data block basis by a Medium Access Control (MAC) layer in the GSM network. A packet data block may also be referred to as a message, a packet, a data block, a Radio Link Control (RLC) block, an RLC/MAC block, or some other terminology. Each packet data block includes a header that indicates the intended recipient of that packet data block.

The mobile station typically performs call setup with the GSM network to obtain assignments of carriers and time slots for the downlink and uplink. The mobile station performs initial acquisition prior to call setup. For initial acquisition, the mobile station tunes to a DL carrier, acquires frequency by processing a frequency correction channel (FCCH), acquires timing by decoding a synchronization channel (SCH), and obtains system information from a broadcast control channel (BCCH). For call setup, the mobile station attempts to establish a radio resource (RR) connection by sending an RR Channel Request message on a random access channel (RACH). A base station receives the request, assigns one or more carriers to the mobile station for each of the downlink and uplink, assigns one or more time slots for each assigned carrier, and assigns one or more traffic channels (TCH). The base station also determines timing advance and frequency correction for the mobile station based on the received request. The timing advance corrects for timing error at the mobile station. The frequency correction accounts for Doppler shift caused by the mobile station's movement. The base station then sends the assigned radio resources (carriers and time slots), timing advance, and frequency correction on an access grant channel (AGCH) to the mobile station. The mobile station applies the timing advance and frequency correction so that the uplink transmissions from the mobile station are aligned in time and frequency at the base station. The mobile station then exchanges signaling with the GSM network to set up the call, e.g., for voice and/or packet data. Thereafter, the mobile station exchanges data with the GSM network on the assigned carriers and time slots. Initial acquisition and call setup are described in various documents from 3GPP.

In general, the mobile station may be assigned any number of carriers on the downlink and any number of carriers on the uplink. The number of DL carriers may be the same as or different from the number of UL carriers. The mobile station may be assigned multiple carriers on the downlink and/or uplink during call setup. The mobile station may also be assigned one carrier for each link initially and may thereafter add more carriers for each link as needed. Carrier setup and tear down may be achieved via Layer 3 signaling, Layer 1 signaling (e.g., similar to a packet-switched handover), and/or implicit signaling. If the number of DL carriers is equal to the number of UL carriers and if there is a fixed mapping between DL and UL carriers, then the mobile station may send acknowledgements (ACKs) on an UL carrier in response to polls received on an associated DL carrier, and vice versa. If the number of DL carriers is different than the number of UL carriers, then a mapping between DL and UL carriers may be used to indicate which carrier on one link is used to send ACKs for each carrier on the other link. If the number of UL carriers is limited to one, then all polls will implicitly result in polling responses on the one UL carrier In an exemplary embodiment, one carrier on each link is designated as an anchor carrier for that link and the remaining carriers, if any, are referred to as auxiliary carriers. The mobile station may perform call setup via the DL and UL anchor carriers. The DL anchor carrier may convey assignments of carriers, time slots, and traffic channels for the downlink and uplink to the mobile station. The mobile station may boot up on the anchor carriers and may set up the auxiliary carriers via the anchor carriers.

The mobile station acquires the frequency and timing of each DL carrier assigned to the mobile station. The frequency and timing of the DL anchor carrier may be acquired based on the FCCH and SCH during initial acquisition. Since all DL carriers transmitted by a given base station are typically aligned in time and frequency, the mobile station may be able to acquire each of the DL auxiliary carriers more quickly using the timing and frequency of the DL anchor carrier.

The mobile station applies the proper timing advance and frequency correction to each UL carrier assigned to the mobile station. In one exemplary embodiment, the UL carriers are assumed to be correlated, and a common timing advance and a common frequency correction are used for all UL carriers assigned to the mobile station. In this exemplary embodiment, the base station may determine the common timing advance and the common frequency correction based on uplink transmissions sent by the mobile station, e.g., on the UL anchor carrier. For example, in a packet transfer mode, the mobile station may transmit random access bursts on an uplink packet timing advance control channel (PTCCH/U) sent on the UL anchor carrier. The base station may estimate the timing advance for the mobile station based on the random access bursts and may send timing advance updates for the mobile station on a downlink packet timing advance control channel (PTCCH/D) sent on the DL anchor carrier. The mobile station may then apply the timing advance updates to all carriers. In another exemplary embodiment, the mobile station transmits random access bursts on each UL carrier, and the base station sends separate timing advance updates for each UL carrier.

The mobile station may send signaling on the uplink in various manners. In one exemplary embodiment, the mobile station sends signaling on the UL anchor carrier. In another exemplary embodiment, the assigned UL carriers are associated with the assigned DL carriers. There may be one-to-one, many-to-one, or one-to-many mapping between the DL carriers and the UL carriers, e.g., depending on the number of carriers assigned for each link. The mobile station may send signaling for each DL carrier on the associated UL carrier.

The mobile station may indicate to the GSM network that it is synchronized to the auxiliary DL carriers. In one exemplary embodiment, indications of synchronization for all DL carriers are sent on the UL anchor carrier. In another exemplary embodiment, an indication of synchronization for each DL carrier is sent on the associated UL carrier. In yet another exemplary embodiment, indications of synchronization are implicit. For example, the GSM network may infer lack of synchronization from failure to receive ACKs from the mobile station for packets sent to the mobile station on the downlink. The indication may also be conveyed in other manners.

In an exemplary embodiment, the DL anchor carrier conveys the following information:
System information (BCCH);
Timing advance (PTCCH/D) for the mobile station; and
Mobile-specific signaling (PACCH) for the mobile station.

The timing advance may be sent on the PTCCH/D and may be used for all UL carriers assigned to the mobile station. In this case, the mobile station does not need to receive the timing advance on the DL auxiliary carriers. The mobile-specific signaling may be sent on a packet associated control channel (PACCH) and may include ACKs for packet data blocks sent by the mobile station on the uplink, power control information, resource assignment and re-assignment messages, and so on.

Figure 3:
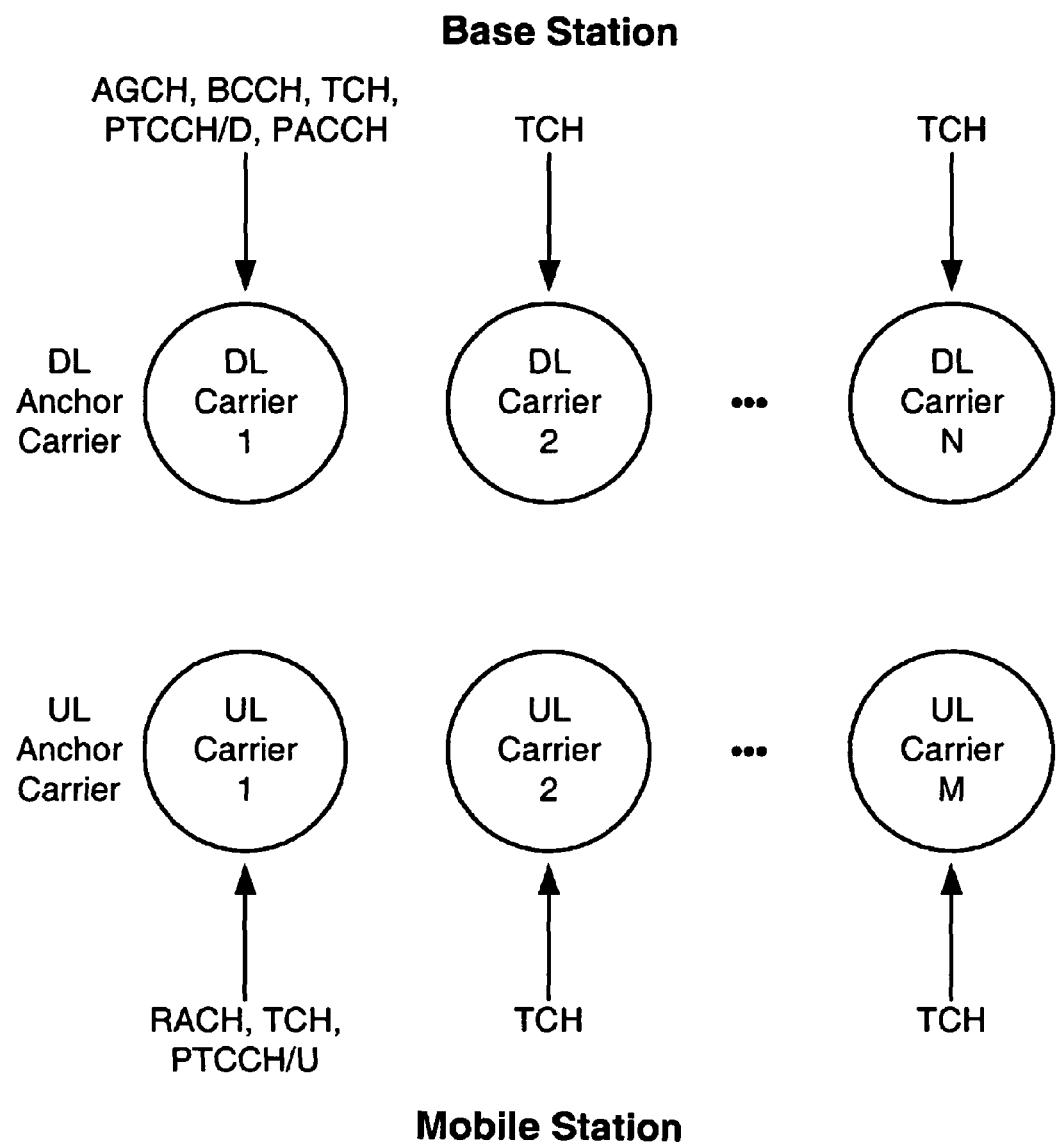
FIG. 3 shows an exemplary embodiment of multi-carrier operation in the GSM network.

FIG. 3 shows an exemplary embodiment of multi-carrier operation in the GSM network. In this exemplary embodiment, the mobile station is assigned N DL carriers 1 through N and M UL carriers 1 through M, where in general $N \geq 1$ and $M \geq 1$. Multiple carriers are assigned for at least one link in multi-carrier operation, so that N>1 and/or M>1. The N DL carriers and M UL carriers may correspond to any ARFCNs and may be at any frequencies. In the exemplary embodiment shown in FIG. 3, DL carrier 1 is designated as the DL anchor carrier and UL carrier 1 is designated as the UL anchor carrier. For call setup, the mobile station may receive system information from the BCCH on the DL anchor carrier, transmit requests on the RACH on the UL anchor carrier, and receive resource assignment from the AGCH on the DL anchor carrier. The DL anchor carrier may also carry the PTCCH/D and PACCH for the mobile station. The mobile station may receive data on all or a subset of the N DL carriers, which carry the downlink TCH(s) for the mobile station. The mobile station may transmit data on all or a subset of the M UL carriers. For example, the mobile station may receive a semi-static assignment of multiple (e.g., two) UL carriers, but may be allowed to transmit only a subset of the multiple UL carriers (e.g., one UL carrier) in any given transmission interval, which may be the duration of a radio block, by uplink status flag (USF)-based scheduling. This would allow the GSM network to control which UL carrier is employed by the mobile station within the radio block granularity. Data and signaling may also be sent on the downlink and uplink in other manners.

The carrier(s) for each link may be used to send voice, packet data, video, and/or other types of data. Each type of data may be sent in one or more temporary block flows (TBFs). A TBF is a physical connection between two RR entities (e.g., the mobile station and a serving base station) to support data transfer. A TBF may also be referred to as a data flow, a data stream, a packet stream, a Radio Link Control (RLC) flow, or some other terminology. Different quality of service (QoS) levels may be achieved for different TBFs based on the requirements of the underlying data. QoS may be quantified by delay requirement, peak data rate, average data rate, delivery option, and so on. For example, a voice flow may have a short delay requirement, a fixed data rate, and best effort delivery because of the time sensitive nature of voice. Packet data may have a longer delay requirement, a high peak data rate, and guaranteed delivery.

The mobile station may support multiple TBFs. In multi-carrier operation, a TBF may be allocated one or more time slots for one or more carriers. Multiple data connections with different QoS levels may be sent in parallel using multiple TBFs. The TBFs may be sent in various manners. In one exemplary embodiment, the TBFs are separated by carriers. For example, one TBF may be sent on each carrier. As another example, multiple TBFs with low QoS may be multiplexed onto one carrier to improve trunking efficiency. This exemplary embodiment may be useful for QoS planning. In another exemplary embodiment, a TBF may be sent on more than one carrier. This exemplary embodiment may allow the TBF to achieve frequency diversity.

The flows, time slots, and carriers represent multiple dimensions that are available for data transmission. Data for different applications may be mapped to flows in various manners. Furthermore, the data in each flow may be sent in the assigned time slots and carriers in various manners.

Figure 4A:
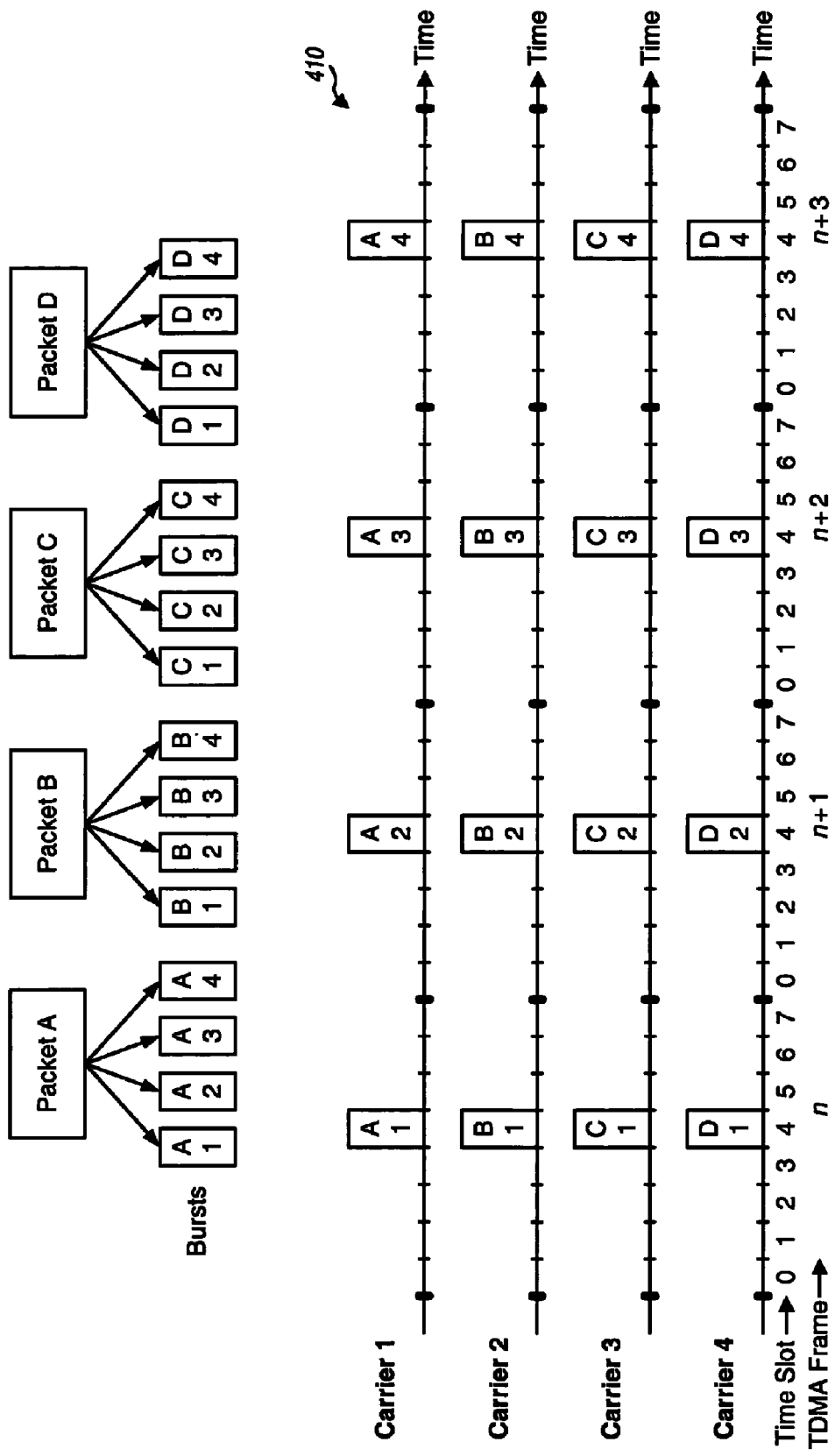

FIG. 4A shows an exemplary embodiment of a data transmission scheme 410 in multi-carrier operation. In the example shown in FIG. 4A, four packet data blocks A through D are sent on four carriers 1 through 4. Each packet data block is processed (e.g., formatted, encoded, interleaved, partitioned, and modulated) to generate four bursts. In the exemplary embodiment shown in FIG. 4A, the four bursts for each packet data block are sent in four time slots with the same index in four consecutive TDMA frames n through n+3 on one carrier. Thus, bursts A1 through A4 for packet A are sent on carrier 1, bursts B1 through B4 for packet B are sent on carrier 2, bursts C1 through C4 for packet C are sent on carrier 3, and bursts D1 through D4 for packet D are sent on carrier 4. This exemplary embodiment provides time diversity for each packet data block.

FIG. 4B shows an exemplary embodiment of a data transmission scheme 420 in multi-carrier operation. In this exemplary embodiment, the four bursts for each packet data block are sent in one time slot of one TDMA frame on all four carriers 1 through 4. Thus, bursts A1 through A4 for packet A are sent on the four carriers in TDMA frame n, bursts B1 through B4 for packet B are sent on the four carriers in TDMA frame n+1, bursts C1 through C4 for packet C are sent on the four carriers in TDMA frame n+2, and bursts D1 through D4 for packet D are sent on the four carriers in TDMA frame n+3. This exemplary embodiment provides frequency diversity and also reduces transmission delays for each packet data block.

FIG. 4C shows an exemplary embodiment of a data transmission scheme 430 in multi-carrier operation. In this exemplary embodiment, the four bursts for each packet data block are sent in four time slots of four TDMA frames on four carriers. This exemplary embodiment provides both time and frequency diversity for each packet data block.

The multi-carrier operation may be designed with graceful degradation, which may be quantified in various manners.

First, the mobile station should not lose a pending call in case the DL and/or UL anchor carrier is lost. Second, the mobile station should still be able to send and/or receive data, possibly at a lower rate, when the DL and/or UL anchor carrier is lost.

The mobile station may detect that it is losing a DL carrier based on signal level and/or signal quality of that DL carrier. The mobile station may report that it has lost the DL carrier. This reporting may be event triggered, e.g., after some quality threshold is crossed. The GSM network may switch DL anchor carrier, if needed, so that signaling (e.g., timing advance) can be sent to ensure proper operation.

If the mobile station is assigned two carriers for a given link and the anchor carrier is lost, then the auxiliary carrier may automatically become the new anchor carrier. If the mobile station is assigned more than two carriers and the anchor carrier is lost, then one of the auxiliary carriers may automatically become the new anchor carrier. The auxiliary carriers for each link may be ranked (e.g., based on channel qualities) by the GSM network and/or the mobile station. Whenever the anchor carrier is lost, the best auxiliary carrier (e.g., the highest rank auxiliary carrier) may become the new anchor carrier.

The GSM network may handle switching of anchor carrier among the assigned carriers for each link. The anchor switching may be performed in a manner to reduce risk of losing signaling. For example, the mobile station may send signaling to the GSM network when it misses the timing advance sent on the PTCCH/D on the DL anchor carrier and may then listen for timing advance from the PTCCH/D on the best or designated DL auxiliary carrier. If mobile-specific signaling is sent on only the DL anchor carrier, then the GSM network may hold the signaling while a switch in the DL anchor carrier is being made and may send the signaling after the switch is completed.

The mobile station may operate in a dual transfer mode (DTM) that supports simultaneous voice and packet data. For a voice+packet data call, voice (or both voice and packet data) may be sent on the anchor carrier and packet data may be sent on the auxiliary carrier(s). Voice may also be moved from one carrier to another carrier, if needed, to achieve the desired performance. For example, if the carrier currently used for voice is worsening in quality while another carrier is improving in quality, then voice may be switched to the improving carrier. As another example, if one carrier is lost, then voice may be preserved via carrier swapping, if necessary, and may be sent on the best available carrier. The switching of carriers for voice may track the switching of anchor carrier or may be independent of anchor switching.

The mobile station may make measurements for the DL carriers assigned to the mobile station, the DL carriers for the serving base station, and/or the DL carriers for neighbor base stations. The measurements may be for received signal level (RXLEV), received signal quality (RXQUAL), mean bit error probability (MEAN_BEP), coefficient of variation of bit error probability (CV_BEP), and/or other quantities. RXLEV, RXQUAL, MEAN_BEP, and CV_BEP are described in 3GPP TS 45.008, entitled "Digital cellular telecommunications system (Phase 2+); Radio subsystem link control," Release 6, June 2005, which is publicly available. The measurements may be used to assign DL carriers to the mobile station, for link adaptation, and/or for other purposes. Link adaptable refers to the selection of a suitable rate (e.g., code rate, modulation scheme, and block size) based on transmission capability of a given radio resource.

The mobile station may make and report measurements in various manners. In one exemplary embodiment, the mobile station makes measurements for each DL carrier assigned to the mobile station and sends measurement reports for all assigned DL carriers. The mobile station may send on the UL anchor carrier a single message that carries the measurement reports for all DL carriers. The mobile station may also send separate measurement report messages on the UL anchor and auxiliary carriers. In another exemplary embodiment, the mobile station makes and reports measurements for only the DL anchor carrier. In this exemplary embodiment, the quality of the DL auxiliary carriers may be inferred from the quality of the DL anchor carrier. The mobile station may also make and report measurements for a subset of the assigned DL carriers. In general, the mobile station may make measurements for any DL carrier and may send measurement reports periodically or whenever changes are detected.

In various exemplary embodiments described above, the mobile station has a DL anchor carrier and an UL anchor carrier that are designated to carry certain signaling on the downlink and uplink, respectively. In another exemplary embodiment, anchor carriers are not used for the downlink and uplink. For example, the DL carriers may operate independently of one another, and the UL carriers may also operate independently of one another. The DL carriers may be associated with the UL carriers so that signaling may be sent on each link to facilitate multi-carrier operation. In yet another exemplary embodiment, an anchor carrier is designated for the downlink, but no anchor carrier is designated for the uplink. In yet another exemplary embodiment, an anchor carrier is designated for the uplink, but no anchor carrier is designated for the downlink.

The TCH, PTCCH, PACCH, FCCH, SCH, BCCH, RACH and AGCH are some of the logical channels supported by GSM. These logical channels are mapped to physical channels. The multiple-access scheme in GSM is TDMA with eight basic physical channels per carrier. A physical channel is defined as a sequence of TDMA frames, a time slot number/index that is within a range of 0 to 7, and a frequency hopping sequence that indicates a specific carrier to use for each TDMA frame.

The GSM network may utilize frequency hopping to achieve diversity. With frequency hopping, a physical channel hops from carrier to carrier in different TDMA frames as indicated by the frequency hopping sequence. Frequency hopping for an assignment of one carrier is described in the aforementioned 3GPP TS 05.01. With a single-carrier assignment, data is sent on only one carrier in a given TDMA frame even though multiple carriers may be used for data transmission in different TDMA frames. If frequency hopping is not utilized, then the frequency hopping sequence indicates the same carrier for all TDMA frames.

With a multi-carrier assignment, data may be sent on multiple carriers in a given TDMA frame. Frequency hopping for an assignment of multiple carriers may be performed in various manners. In one exemplary embodiment, each physical channel in the multi-carrier assignment hops in the same manner as a physical channel in a single-carrier assignment. In this exemplary embodiment, the multi-carrier assignment may be viewed as being composed of multiple assignments of a single physical channel for a single carrier. In other exemplary embodiments, the multiple physical channels in the multi-carrier assignment may hop in different manners.

Figures 5A, 5B:
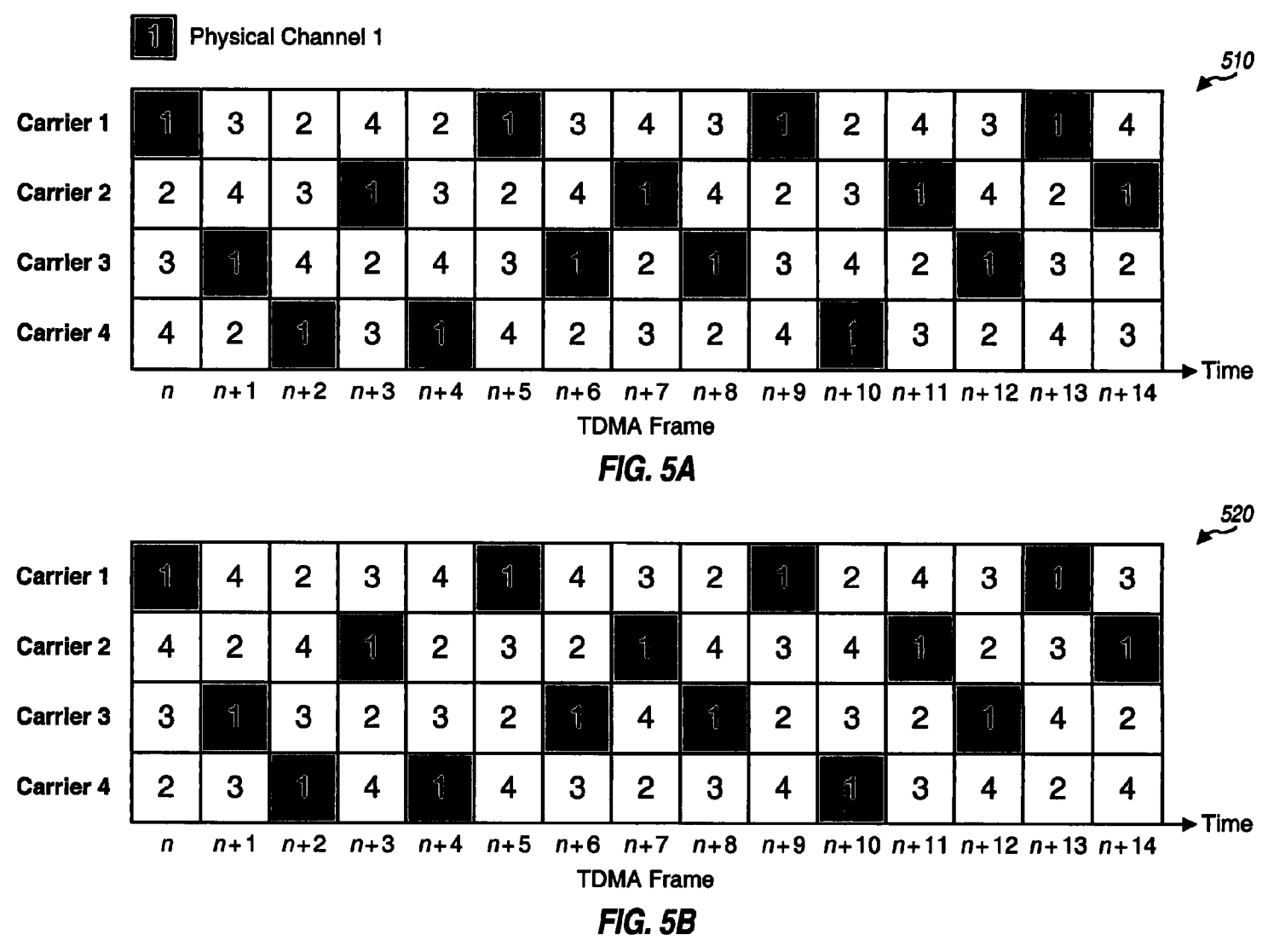

FIG. 5A shows an exemplary embodiment of a frequency hopping scheme 510 in which multiple (e.g., four) physical channels hop based on a single frequency hopping sequence. Each square box in FIG. 5A represents one TDMA frame of one carrier. The number within each square box indicates the physical channel being sent in the TDMA frame of the carrier for that box. In the exemplary embodiment shown in FIG. 5A, the carrier used for physical channel 1 in TDMA frame n is determined by the frequency hopping sequence and is denoted as $C_1(n)$. The carrier used for physical channel k, for k=2, 3, 4, in TDMA frame n may be given as: $C_k(n)=\{[C_1(n)+k-2] \bmod 4\}+1$. In this exemplary embodiment, the physical channels are separated by a constant distance across frequency, except when a wrap-around occurs. For example, physical channels 1 and 2 are separated by one carrier, physical channels 1 and 3 are separated by two carriers, and so on.

FIG. 5B shows an exemplary embodiment of a frequency hopping scheme 520 in which multiple (e.g., four) physical channels hop based on different frequency hopping sequences. The carrier used for each physical channel in each TDMA frame is indicated in FIG. 5B. In the exemplary embodiment shown in FIG. 5B, the physical channels are separated by variable distances that change from TDMA frame to TDMA frame.

In general, frequency hopping for multiple physical channels in a multi-carrier assignment may be achieved in various manners with one or more frequency hopping sequences. The hopping is such that the physical channels for the mobile station do not collide with one another and also do not collide with the physical channels assigned to other mobile stations communicating with the same base station.

The mobile station may have a single receiver or multiple receivers. Each receiver may be coupled to a separate antenna, or more than one receiver may share a common antenna. Each receiver may be able to process a downlink signal from a base station. If two receivers are available, then the mobile station may use these receivers to increase data throughput and/or reduce interruption during handover and cell reselection. The mobile station may perform handover from a serving base station to a target base station while in a traffic state, e.g., if the signal quality of the target base station is better than the signal quality of the serving base station. While in an idle state, the mobile station may perform cell reselection from a serving base station in the GSM network to a target base station in the GSM network or a 3GPP or 3GPP2 network. For both handover and cell reselection, the mobile station may have one receiver tuned to the serving base station and the other receiver tuned to the target base station during a transition phase. The mobile station would then be able to receive signaling from the target base station without missing data and/or signaling from the serving base station. The mobile station may send signaling to the serving base station to inform the GSM network that the mobile station will no longer be receiving one or more of the assigned carriers. The GSM network may then send data and/or signaling to the mobile station on the carrier(s) that the mobile station is still receiving.

Figure 6:
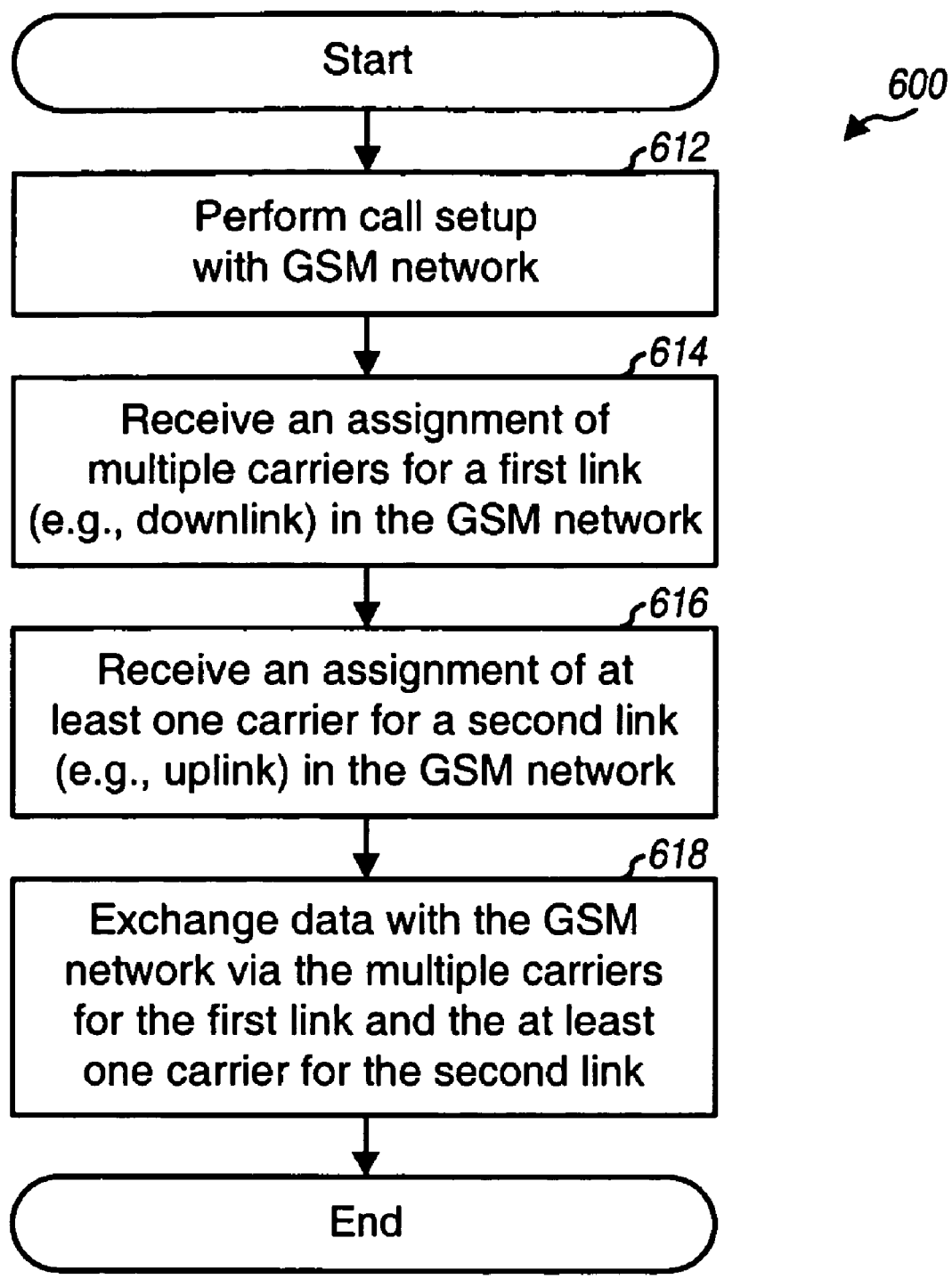
FIG. 6 shows a process for transmitting data in multi-carrier operation.

FIG. 6 shows an exemplary embodiment of a process 600 for transmitting data in multi-carrier operation. The mobile station performs call setup with the GSM network (block 612). The mobile station receives an assignment of multiple carriers (or RF channels) for a first link in the GSM network (block 614). The mobile station receives an assignment of at least one carrier for a second link in the GSM network (block 616). The first link may be the downlink, and the second link may be the uplink. Alternatively, the first link may be the uplink, and the second link may be the downlink. The mobile station exchanges data with the GSM network via the multiple carriers for the first link and the at least one carrier for the second link (block 618).

One carrier for the downlink may be designated as a downlink anchor carrier that is used to send signaling from the GSM network to the mobile station. The mobile station may receive timing advance for the uplink carrier(s) on the PTCCH, mobile-specific signaling on the PACCH, system information on the BCCH, and/or other information sent on the downlink anchor carrier. One carrier for the uplink may be designated as an uplink anchor carrier that is used to send signaling from the mobile station to the GSM network. The mobile station may perform call setup via the downlink and uplink anchor carriers and may set up remaining carriers via the downlink and uplink anchor carriers. The mobile station may also concurrently set up all downlink and uplink carriers.

Data may be sent on the downlink and uplink in various manners. Multiple packet data blocks may be sent on multiple carriers with time and/or frequency diversity. Multiple bursts for each packet data block may be sent (1) in multiple frames on one carrier, e.g., as shown in FIG. 4A, (2) on multiple carriers in one frame, e.g., as shown in FIG. 4B, or (3) in multiple frames on multiple carriers, e.g., as shown in FIG. 4C. Multiple flows of data may also be sent on multiple carriers. Each flow may be sent with a particular QoS selected for that flow. Each flow may also be sent on one carrier to simplify operation or across more than one carrier to achieve frequency diversity.

The mobile station may make measurements for each downlink carrier and may sent measurement reports to the GSM network. The mobile station may also send a report whenever a carrier is detected to be lost. The GSM network may use the reports for carrier assignment, link adaptation, and/or other purposes.

The mobile station may detect loss of the downlink anchor carrier. Another downlink carrier may then be designated as a new downlink anchor carrier. The carriers for each link may be ranked, e.g., based on signal level or signal quality. The highest ranking carrier may be designated as a new anchor carrier if the current anchor carrier is lost.

Frequency hopping may be independently enabled or disabled for each of the downlink and uplink. The mobile station may perform frequency hopping for data sent on multiple carriers for a given link based on a single frequency hopping sequence (e.g., as shown in FIG. 5A) or multiple frequency hopping sequences having variable distance across frequency (e.g., as shown in FIG. 5B).

The mobile station may have multiple (e.g., two) receivers. The mobile station may use one receiver to receive a first signal on a first set of carrier(s) from a first base station and may use another receiver to receive a second signal on a second set of carrier(s) from a second base station, e.g., during handover or cell reselection. The mobile station may use all receivers to receive signal from the serving base station when not in handover to achieve higher throughput and/or receive diversity.

Figure 7:
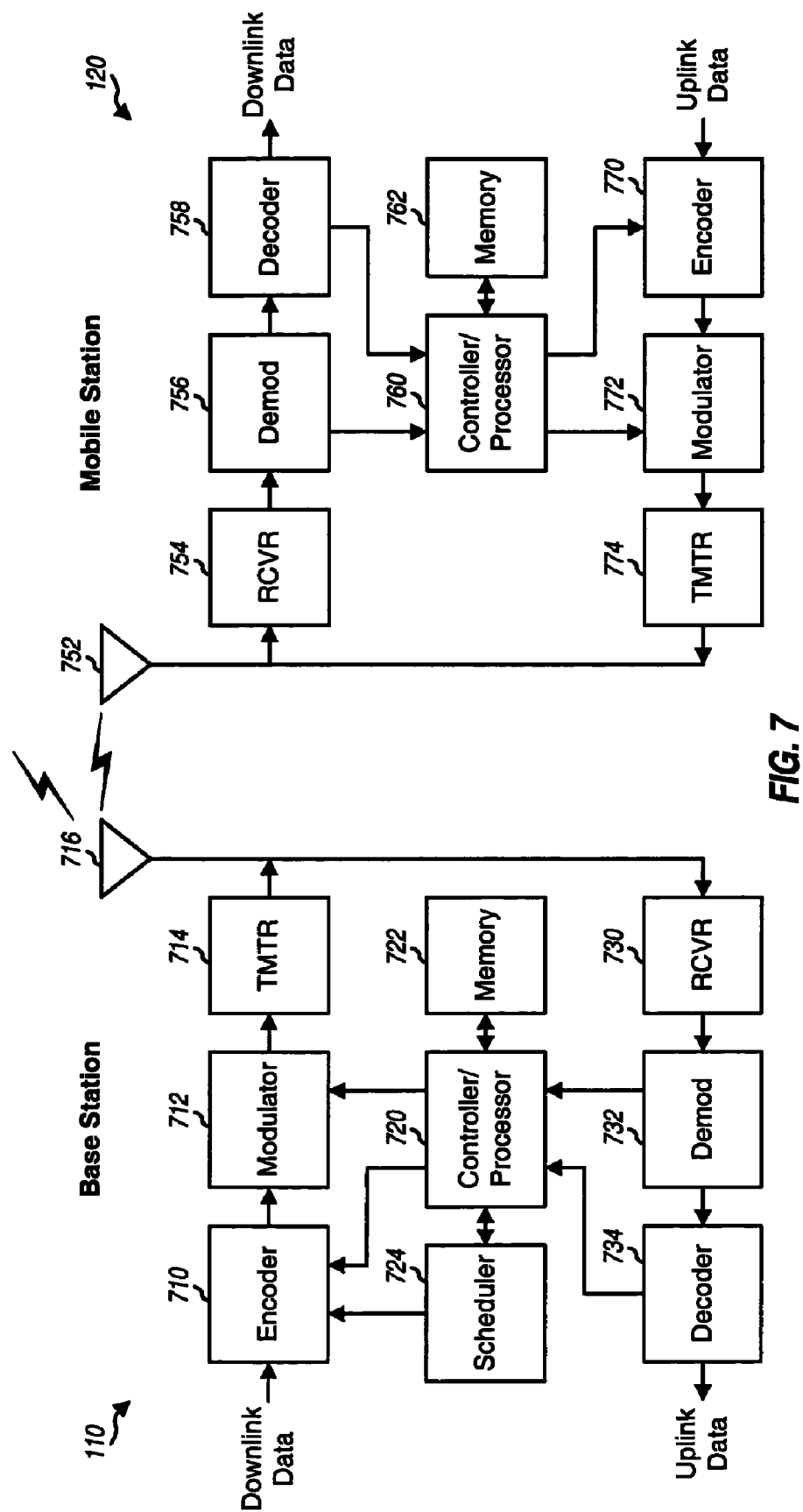
FIG. 7 shows a block diagram of a base station and a mobile station.

FIG. 7 shows a block diagram of an exemplary embodiment of a base station 110 and a mobile station 120. For the downlink, at base station 110, an encoder 710 receives traffic data and signaling (e.g., carrier and time slot assignments and timing advances) for mobile stations being served by base station 110 and overhead data (e.g., system information). Encoder 710 processes (e.g., encodes, interleaves, and symbol maps) the traffic data, signaling, and overhead data and generates output data for various logical channels, e.g., the FCCH, SCH, BCCH, TCH, PTCCH/D, PACCH and AGCH. A modulator 712 processes the output data for the logical channels and generates bursts. Modulator 712 may multiplex the bursts onto the DL carriers in various manners, e.g., as shown in FIGS. 4A through 4C. A transmitter (TMTR) 714 conditions (e.g., converts to analog, amplifies, filters, and frequency upconverts) the bursts and generates a downlink signal, which is transmitted via an antenna 716.

At mobile station 120, an antenna 752 receives the downlink signal from base station 110 as well as downlink signals from other base stations and provides a received signal to a receiver (RCVR) 754. Receiver 754 conditions (e.g., filters, amplifies, frequency downconverts, and digitizes) the received signal and provides data samples. A demodulator (Demod) 756 processes the data samples and provides symbol estimates. In an exemplary embodiment, receiver 754 and/or demodulator 756 perform filtering to pass all DL carriers assigned to mobile station 120. A decoder 758 processes (e.g., symbol demaps, deinterleaves, and decodes) the symbol estimates and provides decoded data for the traffic data and signaling sent by base station 110 to mobile station 120. Demodulator 756 and decoder 758 may perform demodulation and decoding separately for each DL carrier or jointly for all DL carriers, depending on the manner in which the bursts are sent.

On the uplink, at mobile station 120, an encoder 770 processes traffic data and signaling (e.g., radio resource requests, random access bursts, and measurement reports) and generates output data for various logical channels, e.g., the TCH, PTCCH/U and RACH. A modulator 772 further processes the output data and generates bursts. A transmitter 774 conditions the bursts and generates an uplink signal, which is transmitted via antenna 752. At base station 110, the uplink signals from mobile station 120 and other mobile stations are received by antenna 716, conditioned by a receiver 730, processed by a demodulator 732, and further processed by a decoder 734 to recover the traffic data and signaling sent by each mobile station.

Controllers/processors 720 and 760 direct the operation at base station 110 and mobile station 120, respectively. Memories 722 and 762 store data and program codes for base station 110 and mobile station 120, respectively. A scheduler 724 may assign carriers and time slots to mobile stations and may schedule the mobile stations for data transmission on the downlink and uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the exemplary embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus, comprising:
   at least one processor to receive at a mobile station an assignment of multiple carriers for use exclusively for a first link in a Global System for Mobile Communications (GSM) network, to receive at the mobile station an assignment of at least one carrier for use exclusively for a second link in the GSM network, the at least one carrier for the second link being different from the multiple carriers for the first link, and to exchange data by the mobile station with the GSM network via the multiple carriers for the first link and the at least one carrier for the second link,
   wherein the first link is a downlink and the at least one processor is configured to detect loss of a downlink anchor carrier, send to the GSM network an indication that the downlink anchor carrier is lost, and receive signaling from the GSM network via another one of the multiple carriers for the downlink that is designated as a new downlink anchor carrier; and
   a memory coupled to the at least one processor.

2. The apparatus of claim 1, wherein the second link is an uplink in the GSM network.

3. The apparatus of claim 1, wherein the first link is an uplink and the second link is a downlink in the GSM network.

4. The apparatus of claim 2, wherein the at least one processor receives multiple packet data blocks on the multiple carriers for the downlink and receives multiple bursts on one carrier for each of the packet data blocks.

5. The apparatus of claim 2, wherein the at least one processor receives multiple packet data blocks on the multiple carriers for the downlink and receives multiple bursts on the multiple carriers in one frame for each of the packet data blocks.

6. The apparatus of claim 2, wherein the at least one processor receives multiple packet data blocks on the multiple carriers for the downlink and receives multiple bursts in multiple frames on the multiple carriers for each of the packet data blocks.

7. The apparatus of claim 2, wherein the at least one processor receives multiple flows of data on the multiple carriers for the downlink, and wherein each flow is sent on one carrier with a quality of service (QoS) selected for the flow.

8. The apparatus of claim 3, wherein the at least one processor sends data on only a subset of the multiple carriers for the uplink in a given transmission interval.

9. The apparatus of claim 2, wherein the at least one processor receives timing advance for the at least one carrier for the uplink from the downlink anchor carrier.

10. The apparatus of claim 2, wherein the at least one processor receives mobile-specific signaling for the mobile station from the downlink anchor carrier.

11. The apparatus of claim 10, wherein the mobile-specific signaling comprises acknowledgements for packets sent on the uplink, or resource assignment messages, or resource re-assignment messages, or a combination thereof.

12. The apparatus of claim 2, wherein the at least one processor receives a packet timing advance control channel (PTCCH) and a packet associated control channel (PACCH) on the downlink anchor carrier.

13. The apparatus of claim 2, wherein one of the at least one carrier for the uplink is designated as an uplink anchor carrier used to send signaling from the mobile station to the GSM network.

14. The apparatus of claim 1, wherein the at least one processor exchanges voice data and packet data with the GSM network for a voice plus packet data call.

15. The apparatus of claim 1, wherein the at least one processor exchanges voice data on one carrier for the first link and one carrier for the second link and moves the voice data to other carriers for the first and second links, if necessary, to achieve reliable exchange of the voice data.

16. The apparatus of claim 2, wherein the at least one processor exchanges voice data with the GSM network on the downlink anchor carrier and exchanges packet data with the GSM network on remaining downlink carriers.

17. The apparatus of claim 13, wherein the at least one processor performs call setup via the downlink and uplink anchor carriers and sets up remaining carriers for the downlink and uplink via the downlink and uplink anchor carriers.

18. The apparatus of claim 2, wherein the at least one processor obtains measurements for each of the multiple carriers for the downlink and sends measurement reports for the multiple carriers to the GSM network.

19. The apparatus of claim 1, wherein the multiple carriers for the downlink are ranked, and wherein a highest ranking carrier is designated as the new downlink anchor carrier.

20. The apparatus of claim 1, wherein the at least one processor performs frequency hopping for data sent on the multiple carriers for the first link based on a single frequency hopping sequence.

21. The apparatus of claim 1, wherein the at least one processor performs frequency hopping for data sent on the multiple carriers for the first link based on multiple frequency hopping sequences having variable distance across frequency.

22. The apparatus of claim 1, further comprising:
a first receiver to receive a first signal on a first set of at least one carrier from a first base station; and
a second receiver to receive a second signal on a second set of at least one carrier from a second base station.

23. The apparatus of claim 22, wherein the first and second receivers receive the first and second signals from the first and second base stations, respectively, during handover or cell reselection.

24. A mobile station integrated with the apparatus of claim 1.

25. A method, comprising:
receiving at a mobile station an assignment of multiple carriers for use exclusively for a downlink in a Global System for Mobile Communications (GSM) network;
receiving at the mobile station an assignment of at least one carrier for use exclusively for an uplink in the GSM network, the at least one carrier for the uplink being different from the multiple carriers for the downlink;
exchanging data by the mobile station with the GSM network via the multiple carriers for the downlink and the at least one carrier for the uplink,
wherein one of the multiple carriers for the downlink is designated as a downlink anchor carrier used to send signaling from the GSM network to a mobile station;
detecting loss of the downlink anchor carrier; and
sending to the GSM network an indication that the downlink anchor carrier is lost.

26. The method of claim 25, further comprising:
receiving from the downlink anchor carrier timing advance for the at least one carrier for the uplink.

27. The method of claim 25,
wherein another one of the multiple carriers for the downlink is designated as a new downlink anchor carrier.

28. The method of claim 25, wherein one of the at least one carrier for the uplink is designated as an uplink anchor carrier used to send signaling from the mobile station to the GSM network, the method further comprising:
performing call setup via the downlink and uplink anchor carriers; and
setting up remaining carriers for the downlink and uplink via the downlink and uplink anchor carriers.

29. A mobile station configured to perform the method of claim 25.

30. An apparatus, comprising:
means for receiving at a mobile station an assignment of multiple carriers for use exclusively for a downlink in a Global System for Mobile Communications (GSM) network;
means for receiving at the mobile station an assignment of at least one carrier for use exclusively for an uplink in the GSM network, the at least one carrier for the uplink being different from the multiple carriers for the downlink; and
means for exchanging data by the mobile station with the GSM network via the multiple carriers for the downlink and the at least one carrier for the uplink,
wherein one of the multiple carriers for the downlink is designated as a downlink anchor carrier used to send signaling from the GSM network to a mobile station;
means for detecting loss of the downlink anchor carrier; and
means for sending to the GSM network an indication that the downlink anchor carrier is lost.

31. The apparatus of claim 30, further comprising:
means for receiving from the downlink anchor carrier timing advance for the at least one carrier for the uplink.

32. The apparatus of claim 30,
wherein another one of the multiple carriers for the downlink is designated as a new downlink anchor carrier.

33. The apparatus of claim 30, wherein one of the at least one carrier for the uplink is designated as an uplink anchor carrier used to send signaling from the mobile station to the GSM network, the apparatus further comprising:
means for performing call setup via the downlink and uplink anchor carriers; and
means for setting up remaining carriers for the downlink and uplink via the downlink and uplink anchor carriers.

34. An apparatus, comprising:
at least one processor to assign multiple carriers for use exclusively for a first link to a mobile station in a Global System for Mobile Communications (GSM) network, to assign at least one carrier for use exclusively for a second link to the mobile station, the at least one carrier for the second link being different from the multiple carriers for the first link, and to exchange data with the mobile station via the multiple carriers for the first link and the at least one carrier for the second link,
wherein the first link is a downlink and one of the multiple carriers for the downlink is designated as a downlink anchor carrier used to send signaling from the GSM network to the mobile station, and the at least one processor is configured to receive from the mobile station an indication of loss of the downlink anchor carrier and designate another one of the multiple carriers for the downlink as a new downlink anchor carrier; and
a memory coupled to the at least one processor.

35. The apparatus of claim 34, wherein the second link is an uplink.

36. The apparatus of claim 35, wherein the at least one processor sends timing advance for the at least one carrier for the uplink on the downlink anchor carrier to the mobile station.

37. The apparatus of claim 35, wherein one of the at least one carrier for the uplink is designated as an uplink anchor carrier used to send signaling from the mobile station to the GSM network, and wherein the at least one processor performs call setup with the mobile station via the downlink and uplink anchor carriers.

38. A base station integrated with the apparatus of claim 34.

39. A computer program product, comprising:
a non-transitory computer-readable medium comprising:
code for causing at least one computer to receive at a mobile station an assignment of multiple carriers for use exclusively for a downlink in a Global System for Mobile Communications (GSM) network,
code for causing the at least one computer to receive at the mobile station an assignment of at least one carrier for use exclusively for an uplink in the GSM network, the at least one carrier for the uplink being different from the multiple carriers for the downlink,
code for causing the at least one computer to exchange data by the mobile station with the GSM network via the multiple carriers for the downlink and the at least one carrier for the uplink;
code for detecting loss of a downlink anchor carrier;
code for sending to the GSM network an indication that the downlink anchor carrier is lost; and
code for receiving signaling from the GSM network via another one of the multiple carriers for the downlink that is designated as a new downlink anchor carrier.

40. A mobile station integrated with the computer program product of claim 39.

* * * * *